(12) United States Patent
Kuo et al.

(10) Patent No.: US 12,397,180 B2
(45) Date of Patent: Aug. 26, 2025

(54) OPEN TYPE BREATHING-OUT PARTICLES CAPTURE AND FILTRATION DEVICE

(71) Applicant: Yu-Mei Kuo, Tainan (TW)

(72) Inventors: Yu-Mei Kuo, Tainan (TW);
Sheng-Hsiu Huang, Taoyuan (TW);
Chih-Wei Lin, New Taipei (TW);
Chih-Chieh Chen, New Taipei (TW)

(73) Assignee: Kuo Yu-Mei, Tainan (TW)

( * ) Notice: Subject to any disclaimer, the term of this patent is extended or adjusted under 35 U.S.C. 154(b) by 637 days.

(21) Appl. No.: 17/850,659

(22) Filed: Jun. 27, 2022

(65) Prior Publication Data
US 2023/0068863 A1 Mar. 2, 2023

(30) Foreign Application Priority Data
Aug. 24, 2021 (TW) .................................. 110131351

(51) Int. Cl.
*A62B 18/00* (2006.01)
*A62B 9/04* (2006.01)
(Continued)

(52) U.S. Cl.
CPC .............. *A62B 18/003* (2013.01); *A62B 9/04* (2013.01); *A62B 18/084* (2013.01); *A62B 23/02* (2013.01);
(Continued)

(58) Field of Classification Search
CPC .... A62B 7/00; A62B 7/10; A62B 9/00; A62B 9/04; A62B 18/00; A62B 18/003; A62B 18/006; A62B 18/02; A62B 18/08; A62B 18/082; A62B 18/084; A62B 23/00; A62B 23/02; A62B 23/025; A41D 13/11;
(Continued)

(56) References Cited

U.S. PATENT DOCUMENTS

| 2012/0031407 A1* | 2/2012 | Shi ..................... A41D 13/1184 128/206.12 |
| 2013/0213413 A1* | 8/2013 | Lai ..................... A41D 13/1161 128/863 |

(Continued)

FOREIGN PATENT DOCUMENTS

| CN | 109363271 A | * | 2/2019 |
| CN | 111084943 B | * | 10/2020 |

(Continued)

*Primary Examiner* — Colin W Stuart
(74) *Attorney, Agent, or Firm* — Rabin & Berdo, P.C.

(57) ABSTRACT

An open type breathing-out particles capture and filtration device includes a mask having an air-in space defined between an upper edge of the mask and a user's face; a suction assembly including an air expelling pipe communicable with the air-in space and a fan; filtering materials located upstream of the fan; and a power supply driving the fan to rotate and produce a suction airflow. External air flowed into the mask via the air-in space and air breathed out of the user's nose and mouth is sucked by the suction airflow to pass through the filtering materials, so that air discharged from the air expelling pipe is clean air without any infection source. With the air-in space, an additional load applied to the mask by the suction airflow is reduced and contact areas between the mask and the user's face is also reduced, making the mask more comfortable for wearing.

10 Claims, 18 Drawing Sheets

(51) Int. Cl.
*A62B 18/08* (2006.01)
*A62B 23/02* (2006.01)
*B01D 46/00* (2022.01)
*B01D 46/42* (2006.01)

(52) U.S. Cl.
CPC ..... *B01D 46/0047* (2013.01); *B01D 46/4245* (2013.01); *B01D 2279/00* (2013.01)

(58) Field of Classification Search
CPC ............ A41D 13/1107; A41D 13/1115; A41D 13/1123; A41D 13/113; A41D 13/1138; A41D 13/1146; A41D 13/1153; A41D 13/1161; A41D 13/1169; A41D 13/1176; A41D 13/1184; A41D 13/1192
See application file for complete search history.

(56) References Cited

U.S. PATENT DOCUMENTS

| | | | | |
|---|---|---|---|---|
| 2013/0255698 | A1* | 10/2013 | Ryou | A41D 13/1107 128/863 |
| 2014/0060550 | A1* | 3/2014 | Lai | A41D 13/1161 128/863 |
| 2016/0058081 | A1* | 3/2016 | Lee | A41D 13/1161 128/863 |
| 2021/0298387 | A1* | 9/2021 | De La Guardia | A41D 13/1161 |
| 2022/0008759 | A1* | 1/2022 | Piatt | A62B 23/025 |

FOREIGN PATENT DOCUMENTS

| | | | |
|---|---|---|---|
| CN | 212911828 U | * | 4/2021 |
| CN | 213077264 U | * | 4/2021 |
| KR | 102193162 B1 | * | 12/2020 |

\* cited by examiner

OPEN TYPE BREATHING-OUT PARTICLES CAPTURE AND FILTRATION DEVICE

FIELD OF THE INVENTION

The present invention relates to a filtration device for wearing in front of a user's nose and mouth to collect particles contained in the air breathed out of the user's nose and mouth, and more particularly, to an open type breathing-out particles capture and filtration device, which can collect droplets contained in air breathed out of the user's nose and mouth without the need of fully closing the user's face.

BACKGROUND OF THE INVENTION

Recently, since the problem of air pollution becomes more serious than even before, public health is now deemed highly important. During the time of seasonal transition, or in the prevailing seasons of infectious diseases, such as the flu and the coronavirus diseases that spread via aerosols and respiratory droplets exhaled when people talking, breathing or exhaling, people should timely wear a mask to reduce and block hazardous substances from invading their bodies via their noses and mouths.

A variety of functionally or structurally difference masks are available in the market and can be generally divided according to their function and particular application into surgical masks, activated carbon masks, N95 masks, etc. Most available masks are formed to define a closed space therein and include a nose bridge strip for supporting the mask on a user's nose. The nose bridge strip is usually made of a metal or a plastic material, so that the user may manually deform the nose bridge strip to fit it with the user's nose configuration. Since the nose bridge strips are usually made of materials with formability, the user needs to adjust the configuration of the nose bridge strip corresponding to his/her face frequently to thereby cause inconvenience in wearing the mask. Further, nose bridge strip that is not properly fitted on the user's nose bridge would possibly cause pain to the user.

Besides, when the user wears the mask, particles contained in the exhaled air will accumulate on a filtering material in the mask to increase a breathing impedance of the filtering material. As a result, the user wearing the mask has to breathe deeply to intake sufficient air amount. In the event the nose bridge strip does not fitly contact with the user's nose and face, warm air exhaled by the user would leak from a gap between the nose bridge strip and the user's face to condense on the user's eyeglasses and adversely affect the user's vision.

SUMMARY OF THE INVENTION

A primary object of the present invention is to provide an open type breathing-out particles capture and filtration device for wearing on a patient who is suffering from an infectious disease. Droplets and particles contained in air breathed out of the patient's nose and mouth are collected by the capture and filtration device and forced to pass through filtering materials, so that clean air is discharged from the capture and filtration device to avoid patient's droplets from spreading into external air to form an inflection source.

Another object of the present invention is to provide an open type breathing-out particles capture and filtration device that includes an open type mask for contacting with a user's chin only, so that external air can flow into the mask via an air-in space above the user's nose, making the mask more comfortable for wearing and avoiding the disadvantage of overly high breathing impedance as found in the conventional closed type mask.

A further object of the present invention is to provide an open type breathing-out particles capture and filtration device that includes an open type mask detachably assembled from different parts, including a supporting section and a shield section, so that a user may freely change the parts according to personal preference.

A still further object of the present invention is to provide an open type breathing-out particles capture and filtration device that includes filtering materials mounted at different locations in the device to provide multiple times of filtration of the captured particles, so as to ensure the finally discharged air is free of any residual virus. And, the filtering materials are easily replaceable by the user to largely increase the convenience in using the capture and filtration device.

To achieve the above and other objects, the open type breathing-out particles capture and filtration device according to the present invention includes a mask, wearing member a suction assembly, a filtering material, and a power supply. The mask includes a partition section, a supporting section and a shield section. The partition section is configured for fitting on an area beneath a user's mouth and has a first end located closer to the user and configured into a first curved wall, a second end located farther away from the user and configured into a second curved wall, and an open air exit located between the first end and the second end; and a collecting passage is defined between the first curved wall and the second curved wall. The supporting section is connected to the first end of the partition section for contacting with the user's chin. The shield section is upward extended from the second end of the partition section to shield in front of the user's nose, such that an air-in space is formed between an upper edge of the shield section and the user's face.

The wearing member is connected to the mask for holding the mask to the user's head. The suction assembly includes an air expelling pipe assembled to the open air exit of the partition section, and a fan assembled to the air expelling pipe. The filtering material is mounted in one of the mask and the suction assembly. The power supply is electrically connected to the suction assembly for driving the fan to rotate and produce a suction airflow in the mask and the air expelling pipe, such that an external air flowed into the mask via the air-in space and an air breathed out of the user's nose and mouth are sucked to pass through the filtering material before being discharged from the suction assembly into an external environment.

In a preferred embodiment, the partition section further includes a funnel portion, which is connected at an upper side to the first and the second curved wall and has a converged lower side to form the open air exit, such that a downward tapered passage is defined in the funnel portion between the upper and the lower side thereof. The filtering material is mounted in the collecting passage. The second curved wall is formed with an open-top insertion groove, and the shield section includes an insertion portion and a shielding portion. The insertion portion is correspondingly inserted into the insertion groove to hold the shield section on the partition section, and the shielding portion is exposed from the partition section.

In an embodiment, the shield section is inward slant relative to the partition section, such that a first top-view cross-sectional profile taken at the air-in space is smaller than a second top-view cross-sectional profile taken at the collecting passage of the partition section. Further, the shield section has an upper edge that is gradually inclined downward from a central location toward two lateral ends of the shield section, so that a curved shielding wall is formed on the shield section without contacting with the user's face.

In an operable embodiment, the shield section is made of a flexibly deformable material for forming a transparent shielding sheet a V-shaped cut is formed at a top center of the transparent shielding sheet, and two halves edges of the transparent shielding sheet at two opposite sides of the V-shaped cut. The two lateral halves are movable toward each other such that the shield section is capable of being bent into a three-dimensional configuration.

The supporting section includes a first supporting member for contacting with a front side of the user's chin and a second supporting member for contacting with an area beneath the user's chin. The first end of the partition section is provided with a female connecting member, and a male connecting member is connected with the first supporting member thereto. The male connecting member is correspondingly engaged with the female connecting member, such that the supporting section is selectively detachable from the partition section, allowing the user to freely change the supporting section and the shield section.

The air expelling pipe includes a first adaptor, a second adaptor, and a mounting shell located between the first and the second adaptor. The filtering material may be mounted in the mounting shell, and the fan is mounted on the second adaptor. The mounting shell has a first flow cross-sectional area located adjacent to the first adaptor and a second flow cross-sectional area located adjacent to the second adaptor, and the second flow cross-sectional area is larger than the first flow cross-sectional area. Further, the first flow cross-sectional area is larger than an opening cross-sectional area of the open air exit, the second flow cross-sectional area is larger than an outlet cross-sectional area of the second adaptor, and the outlet cross-sectional area of the second adaptor is larger than the opening cross-sectional area of the open air exit.

In another operable embodiment, the capture and filtration device further includes a secondary filtering material and auxiliary wearing member. The secondary filtering material being mounted in the other one of the mask and the suction assembly, such that the air breathed out of the user's nose and mouth passes through the filtering material and the secondary filtering material The auxiliary wearing member is connected to the suction assembly for holding the suction assembly to the user's upper half torso to reduce the load applied by the overall capture and filtration device to the user's head.

Further, the wearing member may be differently designed. In one example, the wearing member includes two contact segments pressing against the user's ears and two extension segments located between the contact segments and two lateral ends of the mask. Alternatively, the wearing member and the mask may together define a wearing space for receiving the user's head therein. In the latter case, the wearing member is made of an elastic material, so that the wearing space is adjustable in size to adapt to the user's head.

The present invention is characterized in that the mask and the user's face are spaced from each other to define an air-in space between them, so that the mask is more comfortable for wearing and overcomes the disadvantage of high breathing impedance in the conventional closed type mask. Further, the fan of the suction assembly produces the suction airflow in the mask and the suction assembly, so that air in the mask is collected and sucked into the suction assembly and forced to pass through filtering materials to effectively prevent droplets in the air breathed out of the user's nose and mouth from spread into external air to form an infection source.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
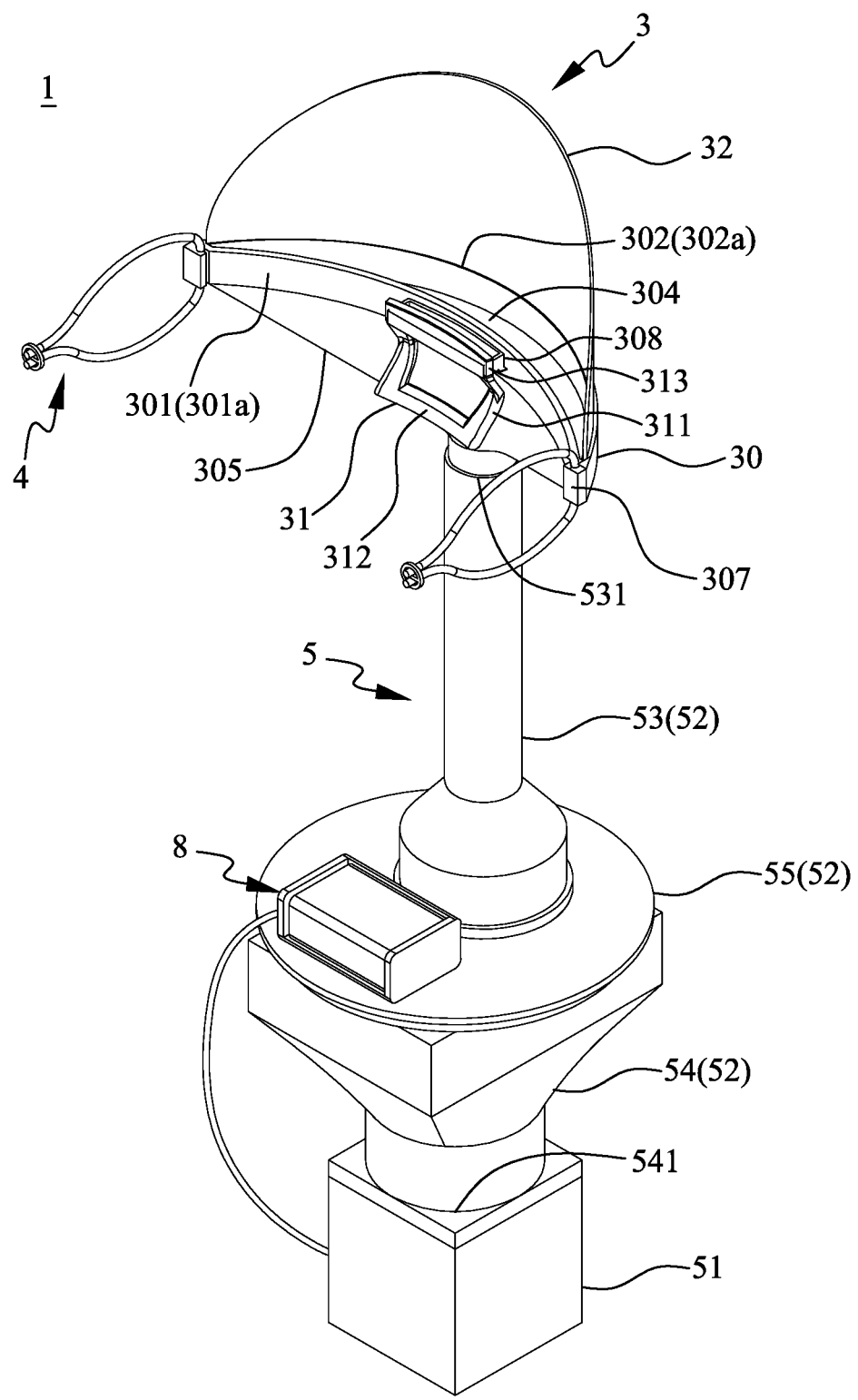
FIG. 1 is an assembled perspective view of an open type breathing-out particles capture and filtration device according to a first and preferred embodiment of the present invention.

The present invention will now be described with some preferred embodiments thereof and by referring to the accompanying drawings. For the purpose of easy to understand, elements that are the same in the preferred embodiments are denoted by the same reference numerals.

Figure 2:
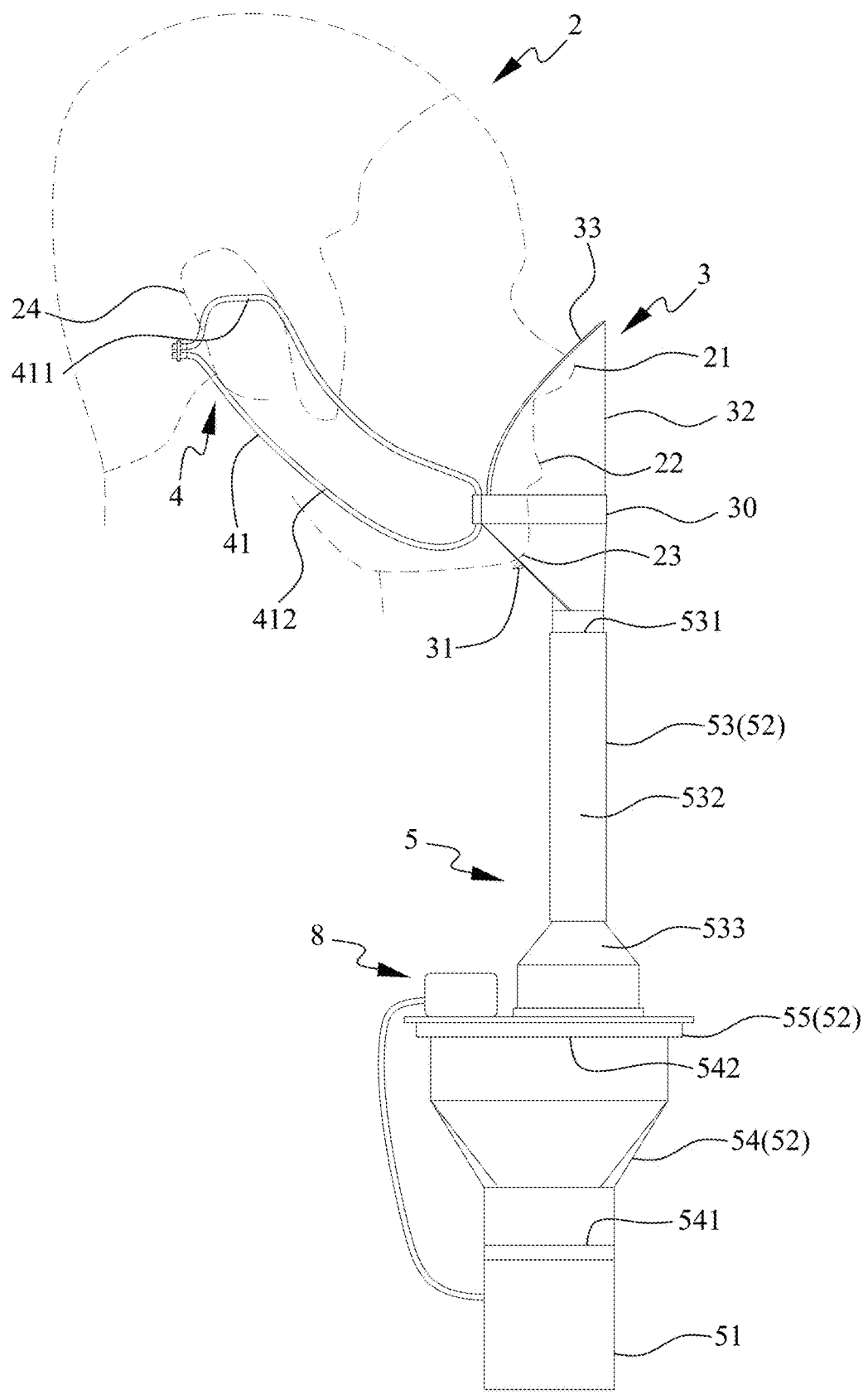
FIG. 2 is a side view showing the capture and filtration device of FIG. 1 wearing on a user.

Please refer to FIG. 1, in which an open type breathing-out particles capture and filtration device 1 according to a first and preferred embodiment of the present invention is shown, and to FIG. 2, which shows a user 2 wearing the open type breathing-out particles capture and filtration device 1 of FIG. 1. For the purpose of conciseness and clarity, the present invention is also briefly referred to as the capture and filtration device 1 herein. As shown, the capture and filtration device 1 is configured for wearing on the user's head 20 to shield the user's face, air breathed out of the user's nose 21 and mouth 22 is sucked and collected by the capture and filtration device 1 and is then filtered therein to produce and discharge clean air, so as to avoid diseases spread via droplet infection, such as the flu, enterovirus disease, coronavirus disease, etc. from getting others sick.

Figure 3:
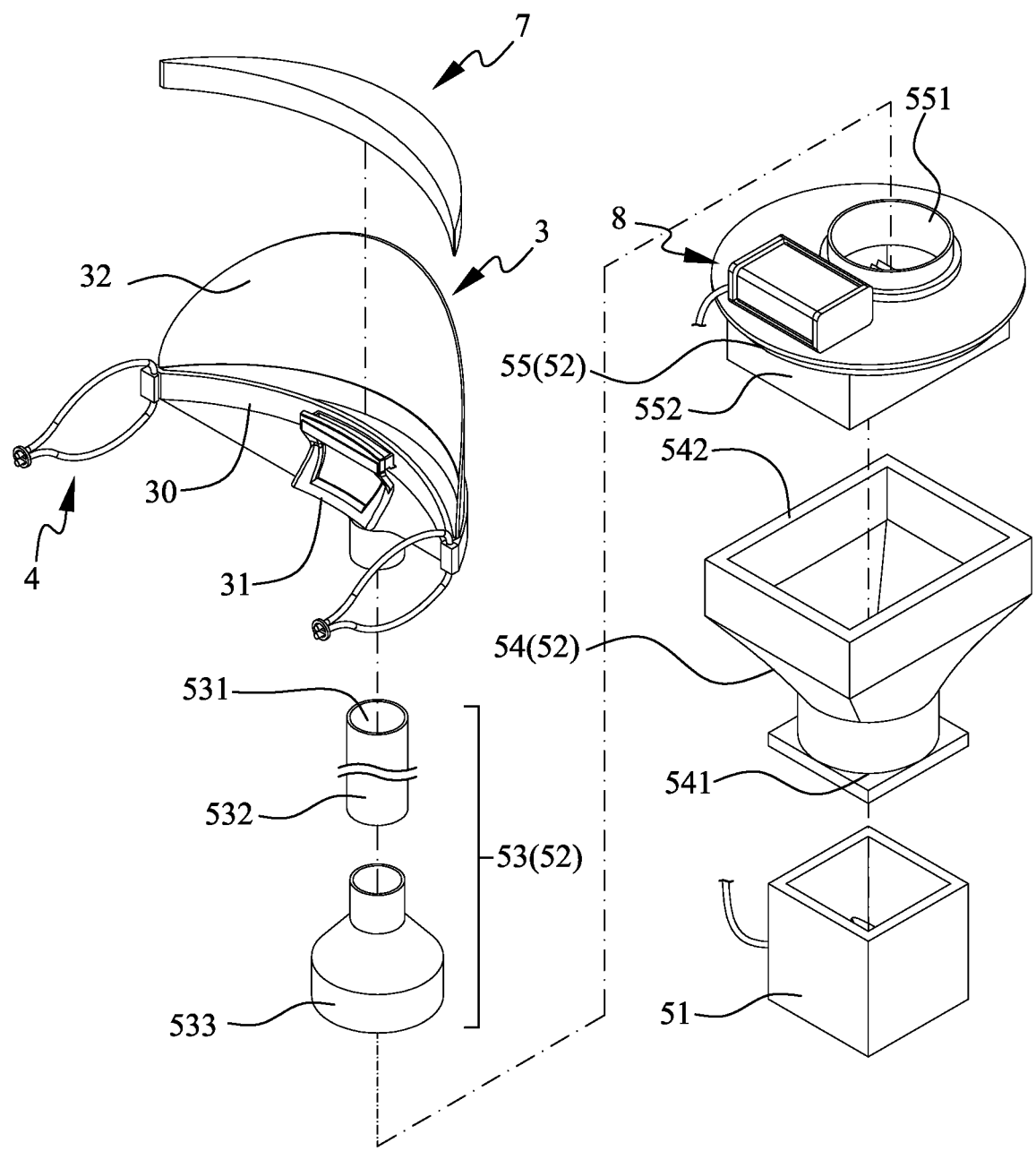
FIG. 3 is an exploded perspective view of the capture and filtration device of FIG. 1.
Figure 4:
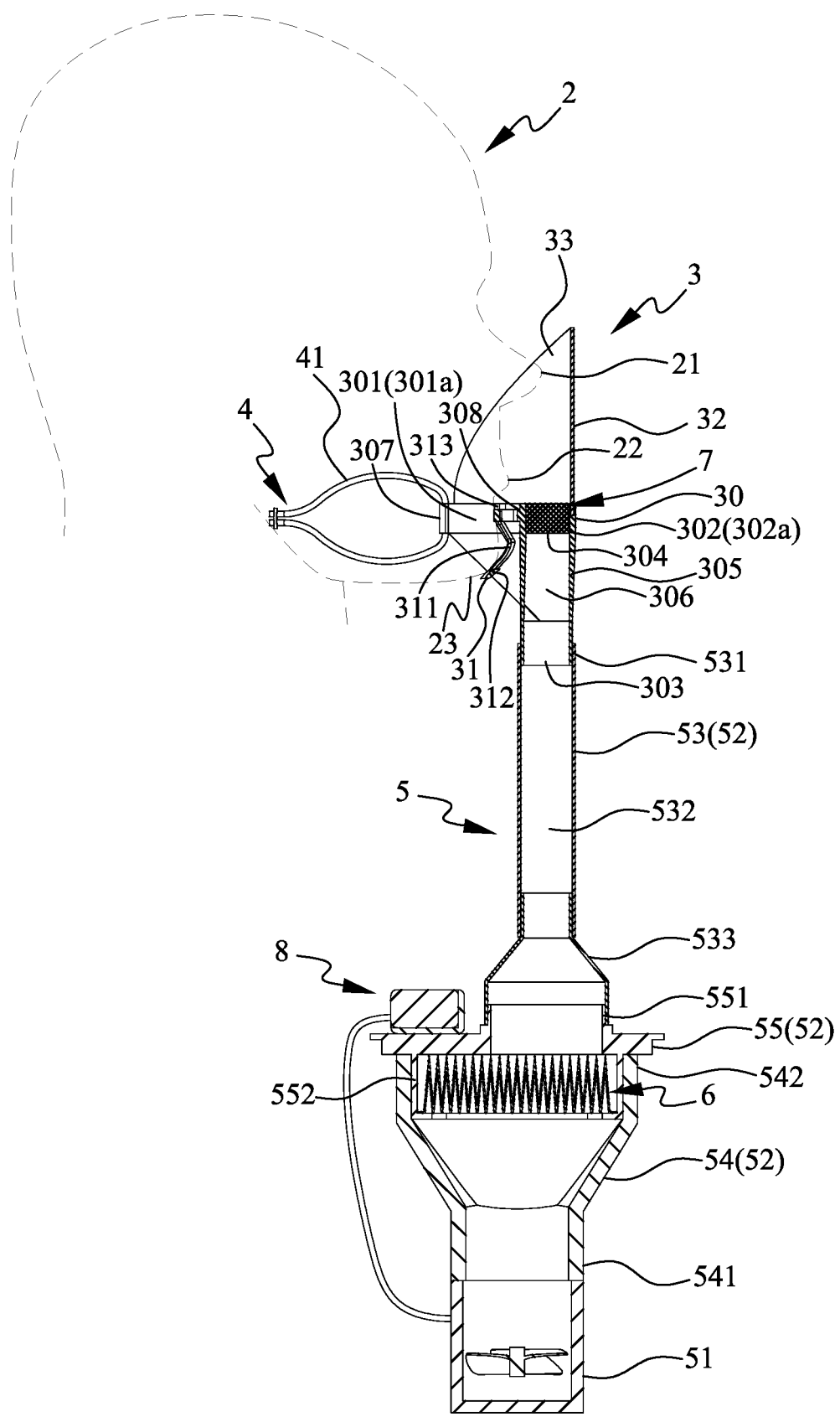
FIG. 4 is an assembled sectional view of the capture and filtration device of FIG. 1.
Figure 5:
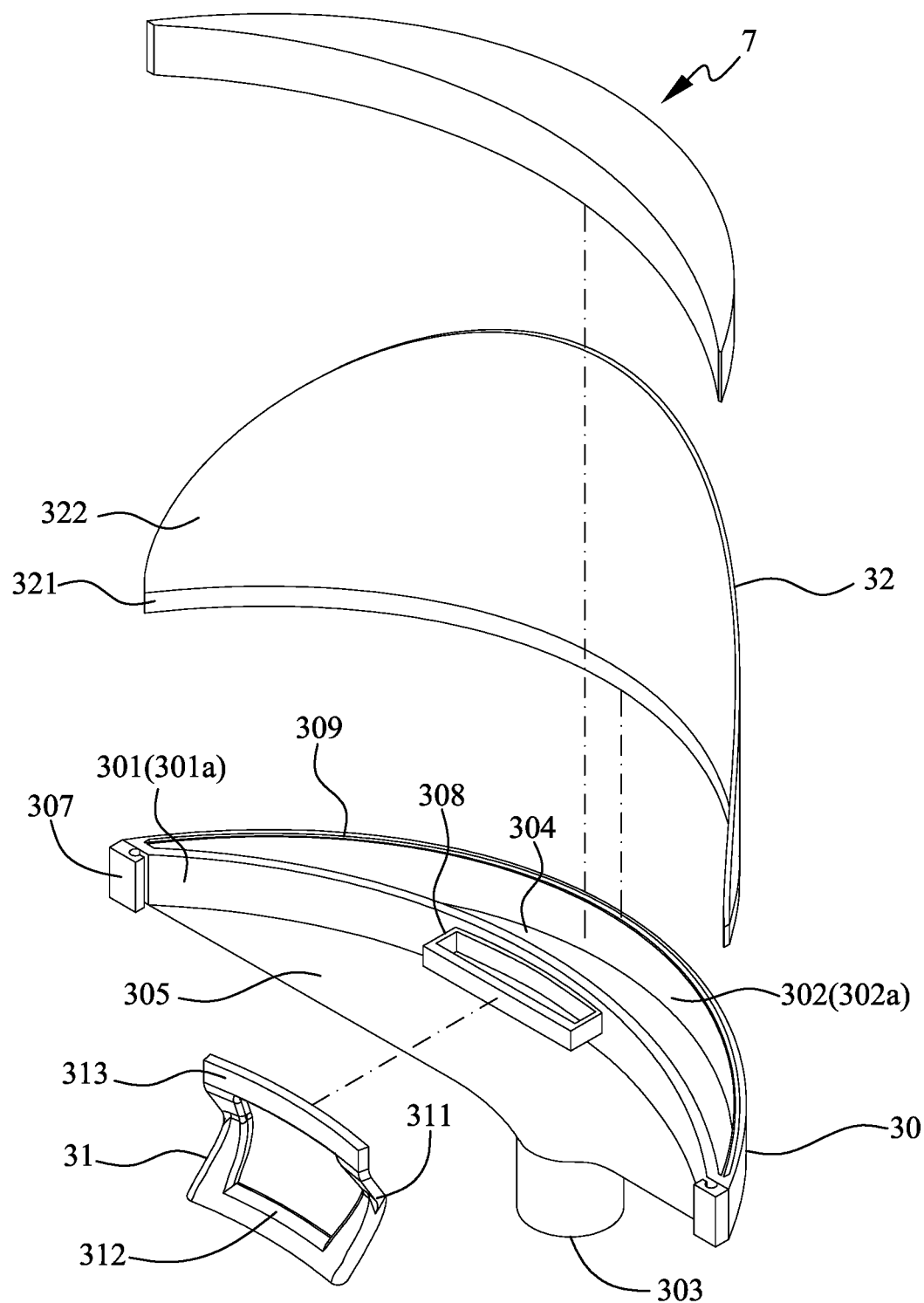
FIG. 5 is an exploded perspective view of a mask included in the capture and filtration device of FIG. 1.

Please refer to FIGS. 3 to 5. The capture and filtration device 1 includes a mask 3, wearing member 4, a suction assembly 5, a filtering material 6, a secondary filtering material 7, and a power supply 8. The mask 3 is in contact with the user's face and located in front of the user's nose 21 and mouth 22 as a shield. The wearing member 4 are used to hold the mask 3 to the user's face at a front side of the user's head. The suction assembly 5 is used to produce a suction airflow F and includes an inlet end 531 and an outlet end 541; air collected by the mask 3 enters the suction assembly 5 via the inlet end 531 and leaves the suction assembly 5 via the outlet end 541. The filtering material 6 and the secondary filtering material 7 are mounted in the suction assembly 5 and the mask 3, respectively, and located in an airflow path of the suction airflow F to provide multiple times of filtration of the air flowing through them. The power supply 8 is connected to a fan 51 of the suction assembly 5 to keep the fan 51 rotating continuously to produce the suction airflow F.

As shown, the mask 3 includes a partition section 30 for fitting on an area beneath the user's mouth 22, a supporting section 31 for contacting with the user's chin 23, and a shield section 32 located in front of the user's nose 21. The partition section 30 has a first end 301 located closer to the user 2, a second end 302 located farther away from the user 2, and an open air exit 303 located between the first end 301 and the second end 302. The supporting section 31 is removably assembled to the first end 301 of the partition section 30; and the shield section 32 is removably assembled to the second end 302 of the partition section 30. With these arrangements, the user 2 may freely change the supporting section 31 and the shield section 32 to different styles according to personal preference.

The first end 301 of the partition section 30 is configured into a first curved wall 301a having a relatively small curvature, and the second end 302 of the partition section 30 is configured into a second curved wall 302a having a relatively larger curvature compared to the first curved wall 301a, such that the first curved wall 301a and the second curved wall 302a together define a substantially crescent area between them to serve as a collecting passage 304. Lower edges of the first and second curved walls 301a, 302a are commonly connected to an upper side of a funnel portion 305. A lower side of the funnel portion 305 is converged into the open air exit 303 that has a small cross-sectional area than that of the upper side of the funnel portion 305, so that a downward tapered passage 306 is defined in the funnel portion 305 between the upper and the lower side thereof. The first curved wall 301a and the second curved wall 302a respectively have two lateral ends, the lateral ends at the same side of the two curved walls 301a, 302 are located adjacent to each other and have a locating element 307 provided thereat.

The shield section 32 is vertically upward extended from the second curved wall 302a, such that an open air-in space 33 is formed between an upper edge 321 of the shield section 32 and the user's face. The upper edge 321 of the shield section 32 is gradually inclined downward from a central location toward the two lateral ends of the shield section 32, making the shield section 32 a curved shielding wall. When the user 2 wants to change or adjust the mask 3 to a different wearing angle relative to the user's face, the curved shielding wall can reduce the chance of contacting it with the user's face and accordingly, increases the comfortableness of the mask 3 for wearing. However, it is understood the above design is non-restrictive, and the shield section 32 can be otherwise rectangular in shape having a constant height. In the latter case, the mask 3 can provide better closure of the user's nose 21 and mouth 22 and accordingly, enhanced particles capture efficiency.

In the first embodiment, the supporting section 31 includes a first supporting member 311 for contacting with a front side of the user's chin 23, and a second supporting member 312 for contacting with an area beneath the user's chin 23. In addition, a male connecting member 313 is connected to the first supporting member 311 for engaging with a female connecting member 308 provided on the first curved wall 301a of the partition section 30. With these arrangements, the supporting section 31 is removably assembled to the partition section 30. Further, the shield section 32 includes an insertion portion 321 and a shielding portion 322. The insertion portion 321 is inserted into an open-top insertion groove 309 formed on the second curved wall 302a to hold the shield section 32 in place on the partition section 30. The shielding portion 322 is located above the insertion portion 321 to expose from the partition section 30.

Figure 6:
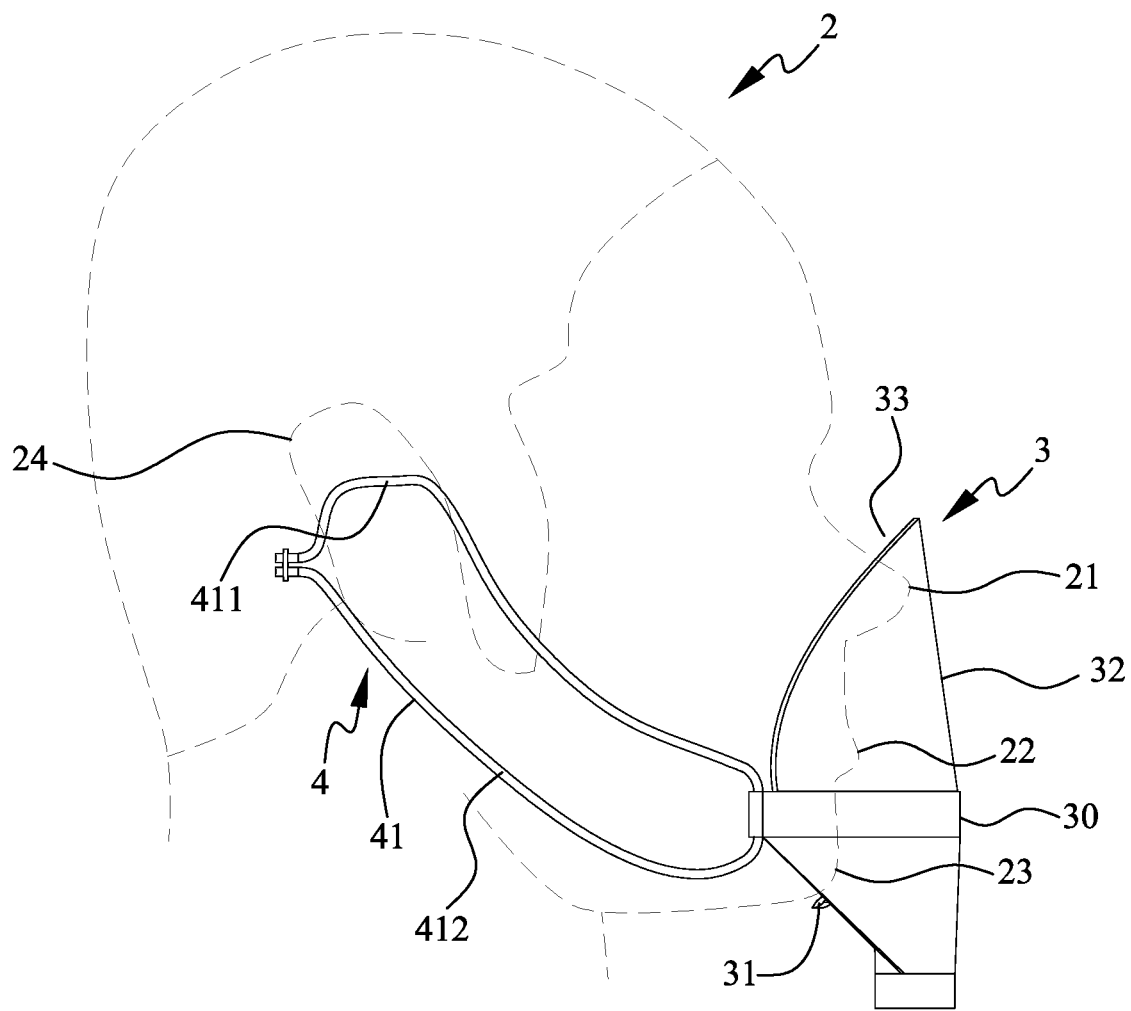
FIG. 6 is a schematic side view showing the mask in a second embodiment of the present invention.
Figure 7A:
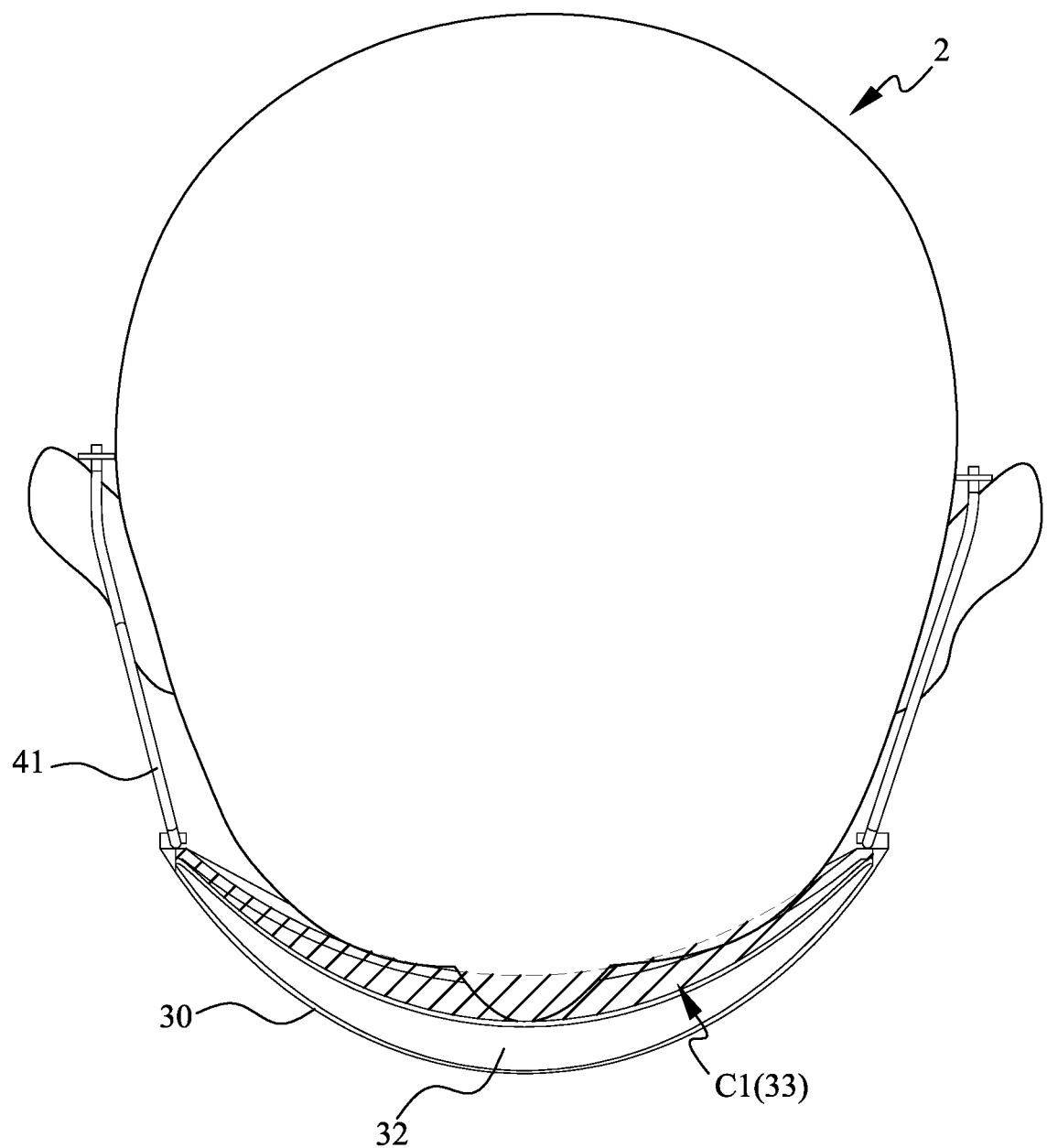
FIG. 7A shows a cross-sectional profile of an air-in space in the mask of FIG. 6.
Figure 7B:
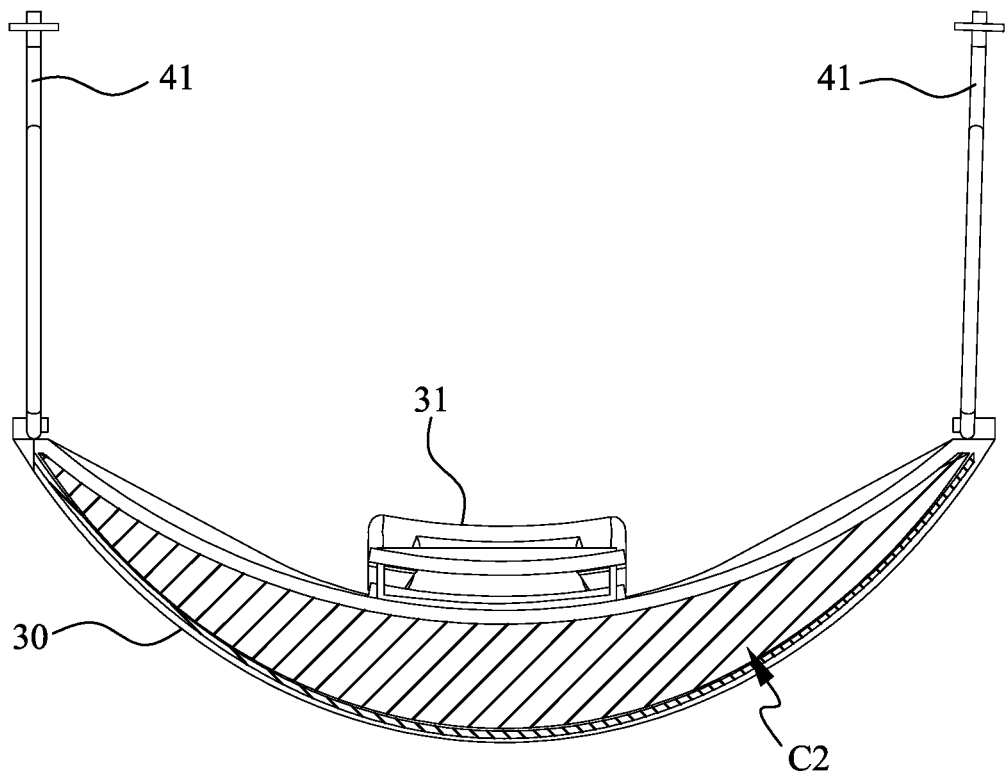
FIG. 7B shows a cross-sectional profile of a collecting passage defined between the mask of FIG. 6 and a user's face.

Please refer to FIGS. 6, 7A and 7B. In a second embodiment of the present invention, the shield section 32 is inward slant from the second curved wall 302a toward the user 2 to extend to a location above the user's nose 21. When viewing downward from the user's head, the air-in space 33 defined between the user's face and the shield section 32 has a first top-view cross-sectional profile C1, and the collecting passage 304 defined between the first curved wall 301a and the second curved wall 302a has a second top-view cross-sectional profile C2. And, the first top-view cross-sectional profile C1 has an area smaller than that of the second top-view cross-sectional profile C2.

Please refer to FIGS. 2 and 4. The wearing member 4 is connected to the locating elements 307. In the first embodiment of the present invention, the wearing member 4 includes two independent elastic strings 41 respectively formed into a loop, so that the loops formed of the elastic strings 41 can be elastically wound around the user's ears 24. With the elasticity of the elastic strings 41, the mask 3 is held to the user's head. The two elastic strings 41 respectively include a contact segment 411 and an extension segment 412. The contact segments are pressed against the user's ears 24, and the extension segments 412 are located between the locating elements 307 and the contact segments 411.

Figure 8A:
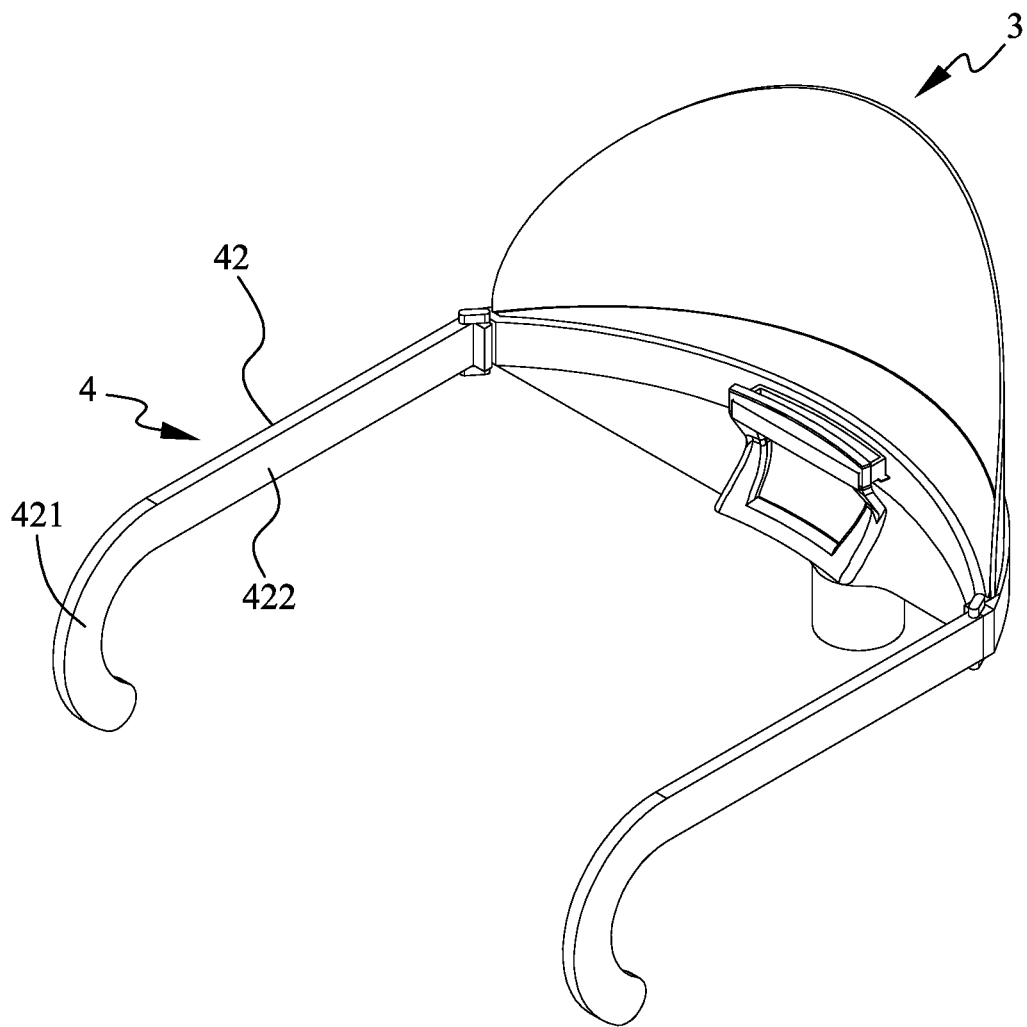
FIGS. 8A to 8C are perspective views of different embodiments of wearing member for use with the mask.
Figure 8B:
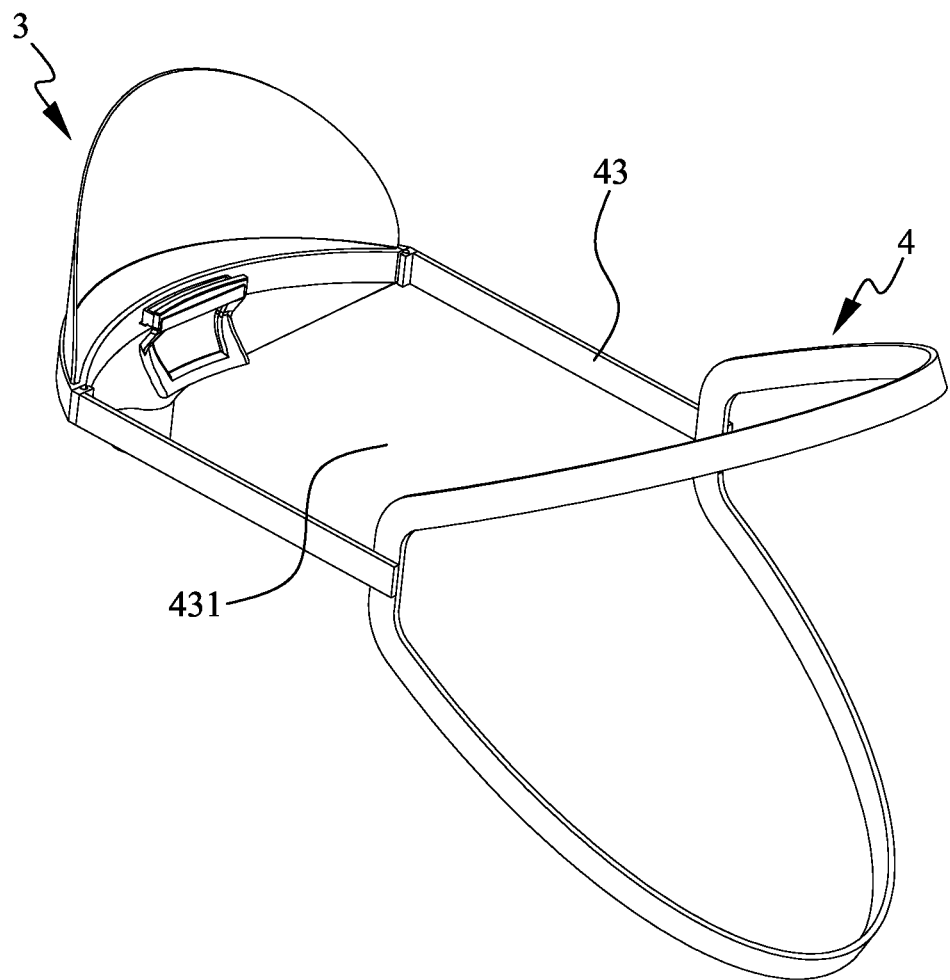
Figure 8C:
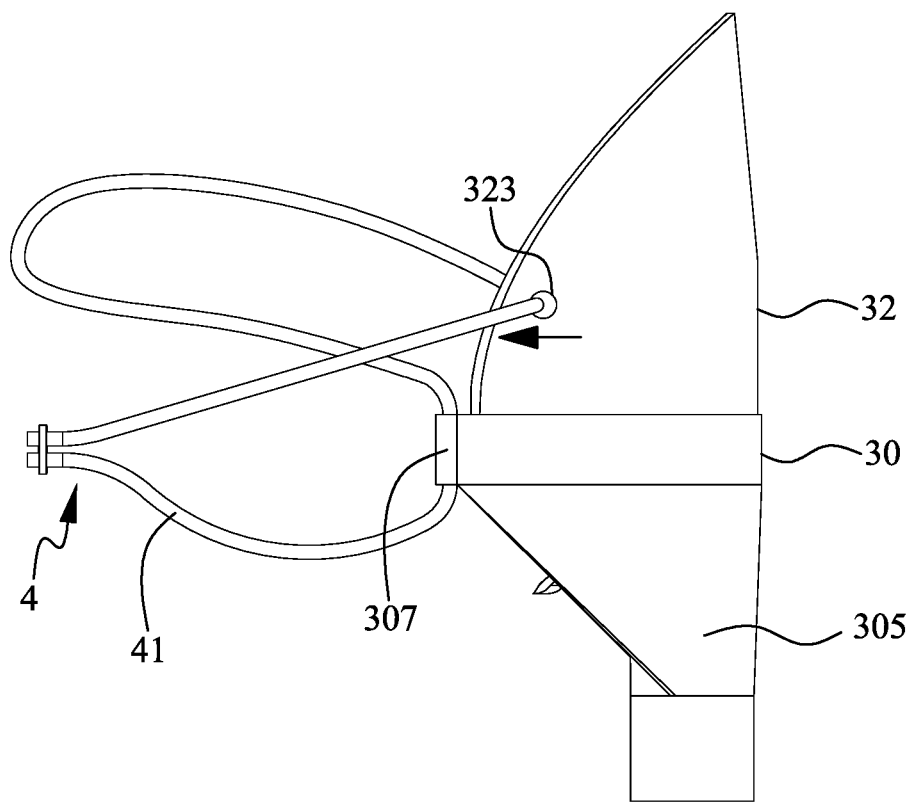

However, it is understood the above description of the wearing member 4 in the form of two elastic strings 41 is not intended to limit the structural configuration of the wearing member 4 in any way. As shown in FIG. 8A, the wearing member 4 can be in the form of a pair of temples 42 pivotally connected to the locating elements 307. The temples 42 respectively include a contact segment 421 and an extension segment 422. The contact segments 421 are configured for hooking on and contacting with the user's ears 24 and the extension segments 422 are located between the locating elements 307 and the contact segments 421. Alternatively, as shown in FIG. 8B, the wearing member 4 can be a tie strip 43 made of an elastic material. The tie strip 43 and the mask 3 together define a size-adjustable wearing space 431 to adapt to different users' heads. Or, as shown in FIG. 8C, the wearing member 4 includes two elastic strings 41 and the shield section 32 is correspondingly provided at two lateral sides with a hole 323 each. Each of the elastic strings 41 is extended through the hole 323 and the locating element 307 at the same side of the shield section 32 to form two loops for simultaneously winding around each of the user's two ears 24. In this case, the shield section 32 is also pulled by the elastic strings 41 to slightly deform and move closer to the user's face.

Figure 9A:
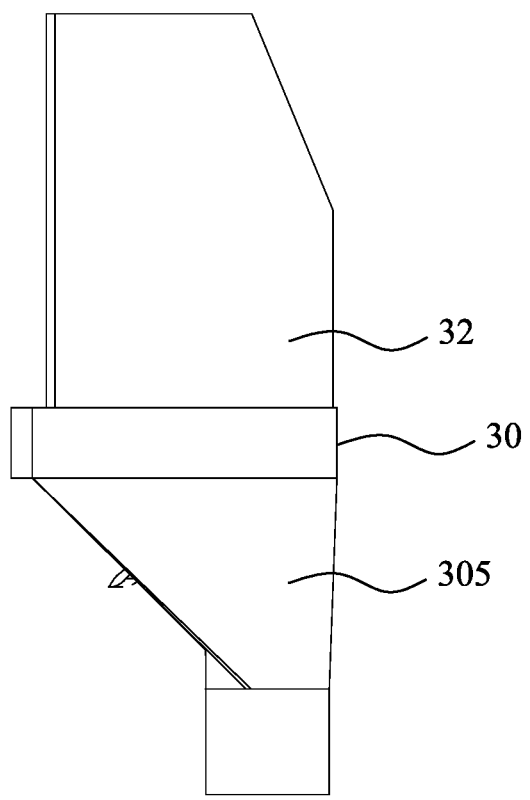
FIGS. 9A to 9C show different configurations available for a shield section of the mask.
Figure 9A:
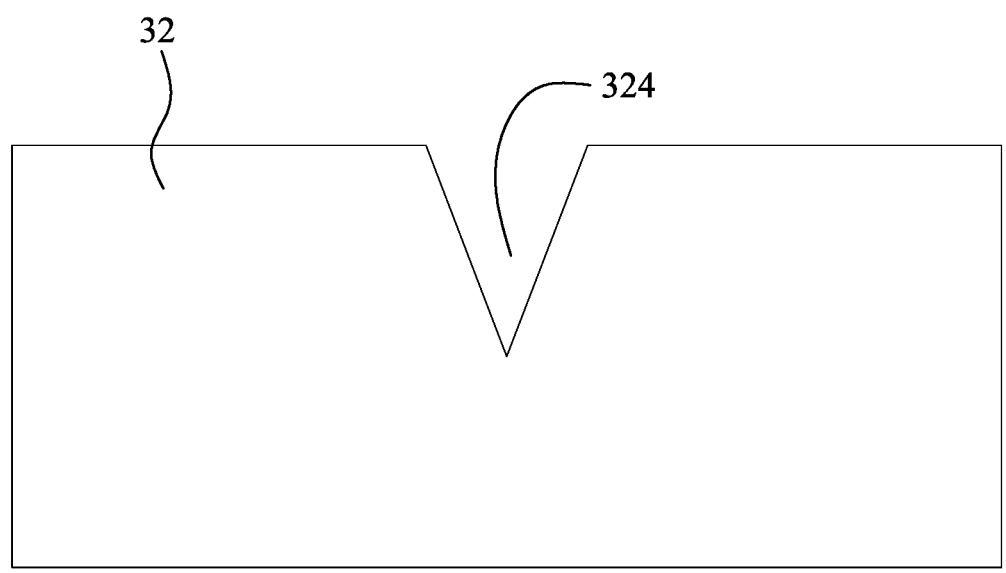
Figure 9B:
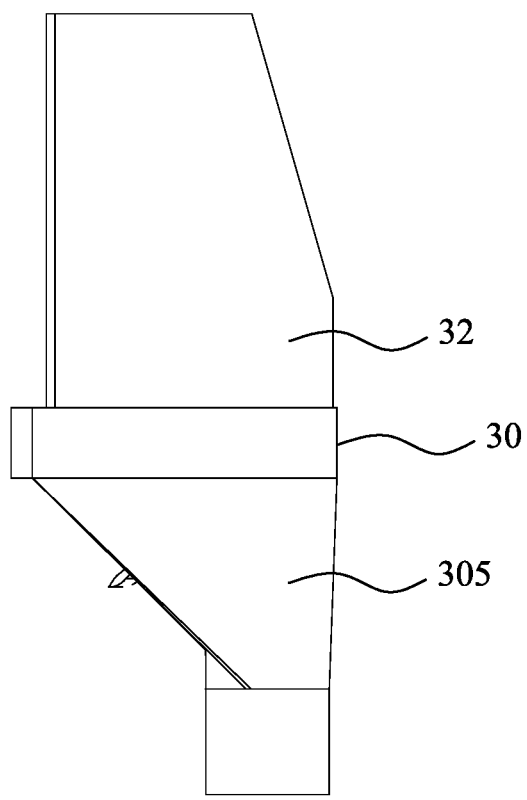
Figure 9B:
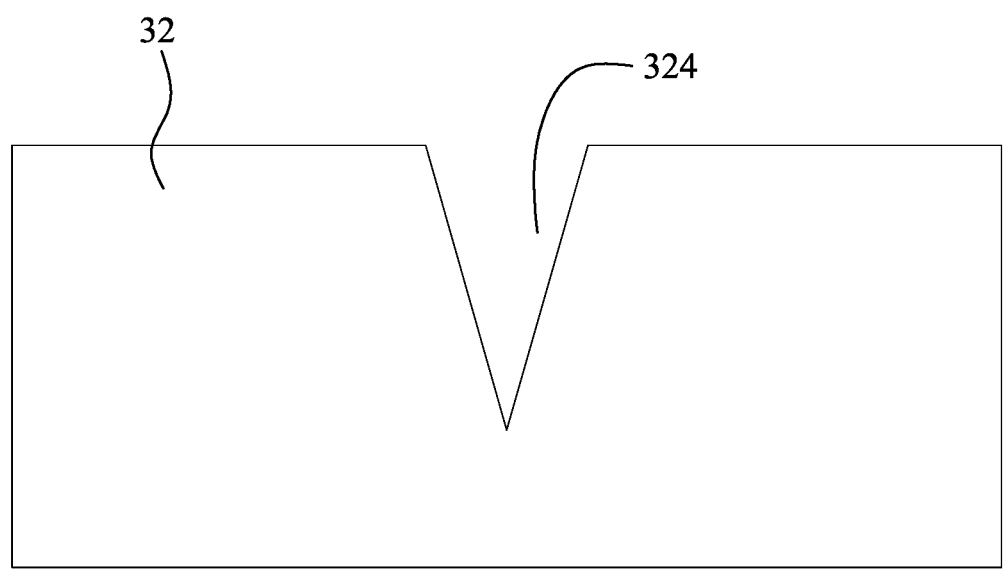
Figure 9C:
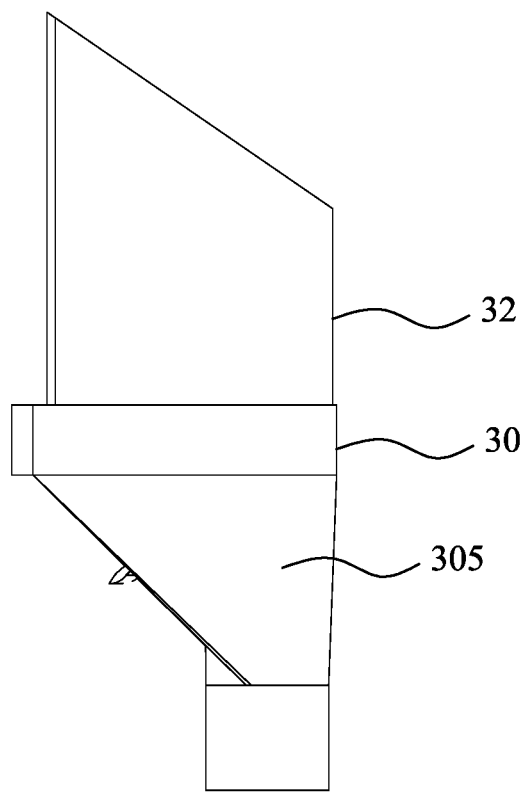
Figure 9C:
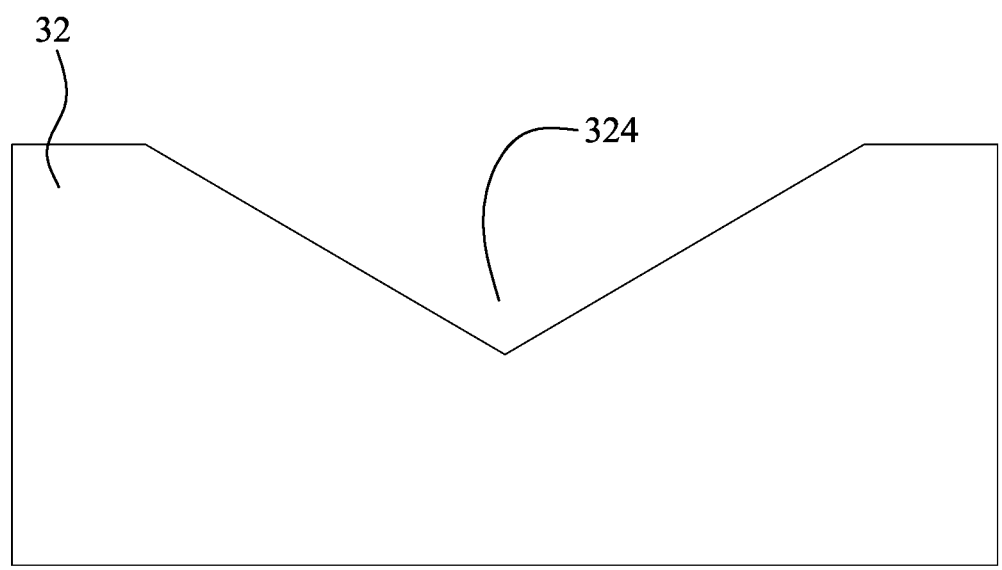

Please refer to FIGS. 9A to 9C. The shield section 32 may be formed of a flexibly deformable clear shielding sheet, which has a V-shaped cut 324 formed at a top center thereof. When bending the clear shielding sheet at the V-shaped cut 324 to move two laterally opposite halves of the clear shielding sheet toward each other, the V-shaped cut 324 is transformed into a downward slant edge. As shown, different depths or opening widths of the V-shaped cut 324 allow the shield section 32 to be bent into different three-dimensional configurations.

Please refer to FIGS. 3 and 4. The suction assembly 5 includes an air expelling pipe 52 assembled to the open air exit 303 of the partition section 30, and the fan 51 is assembled to a tail end of the air expelling pipe 52. The air expelling pipe 52 includes a first adaptor 53 forming the inlet end 531 of the air expelling pipe 52, a second adaptor 54 forming the outlet end 541 of the air expelling pipe 52, and a mounting shell 55 located between the first adaptor 53 and the second adaptor 54. The first adaptor 53 includes a first pipe section 532 connected at an upper end to the open air exit 303 and an expanded pipe section 533 connected to a lower end of the first pipe section 532.

The mounting shell 55 includes a round wall portion 551 and a square wall portion 552 formed on a top and a bottom thereof, respectively. The round wall portion 551 is located adjacent to the expanded pipe section 533 of the first adaptor 53 and has a first flow cross-sectional area; and the square wall portion 552 is located adjacent to the second adaptor 54 and has a second flow cross-sectional area. The second flow cross-sectional area is larger than the first flow cross-sectional area, and the first flow cross-sectional area is larger than an opening cross-sectional area of the open air exit.

The second adaptor 54 includes the above-mentioned outlet end 541 and an adapting end 542. The adapting end 542 is connected to the square wall portion 552, and the fan 51 is connected to the outlet end 541. A length of the second adaptor 54 located between the adapting end 542 and the outlet end 541 forms a downward tapered wall portion, so that the second flow cross-sectional area of the square wall portion 552 is larger than an outlet cross-sectional area of the second adaptor 54, and the outlet cross-sectional area of the second adaptor 54 is larger than the opening cross-sectional area of the open air exit 303.

Please refer to FIG. 4. The filtering material 6 is mounted in the mounting shell 55 and includes a plurality of zigzags formed on its surfaces to increase contact areas for filtration. The secondary filtering material 7 is a flat piece mounted in the collecting passage 304. With these filtering materials, the capture and filtration device 1 of the present invention provides multiple times of filtration of the air flowing therethrough.

Figure 10:
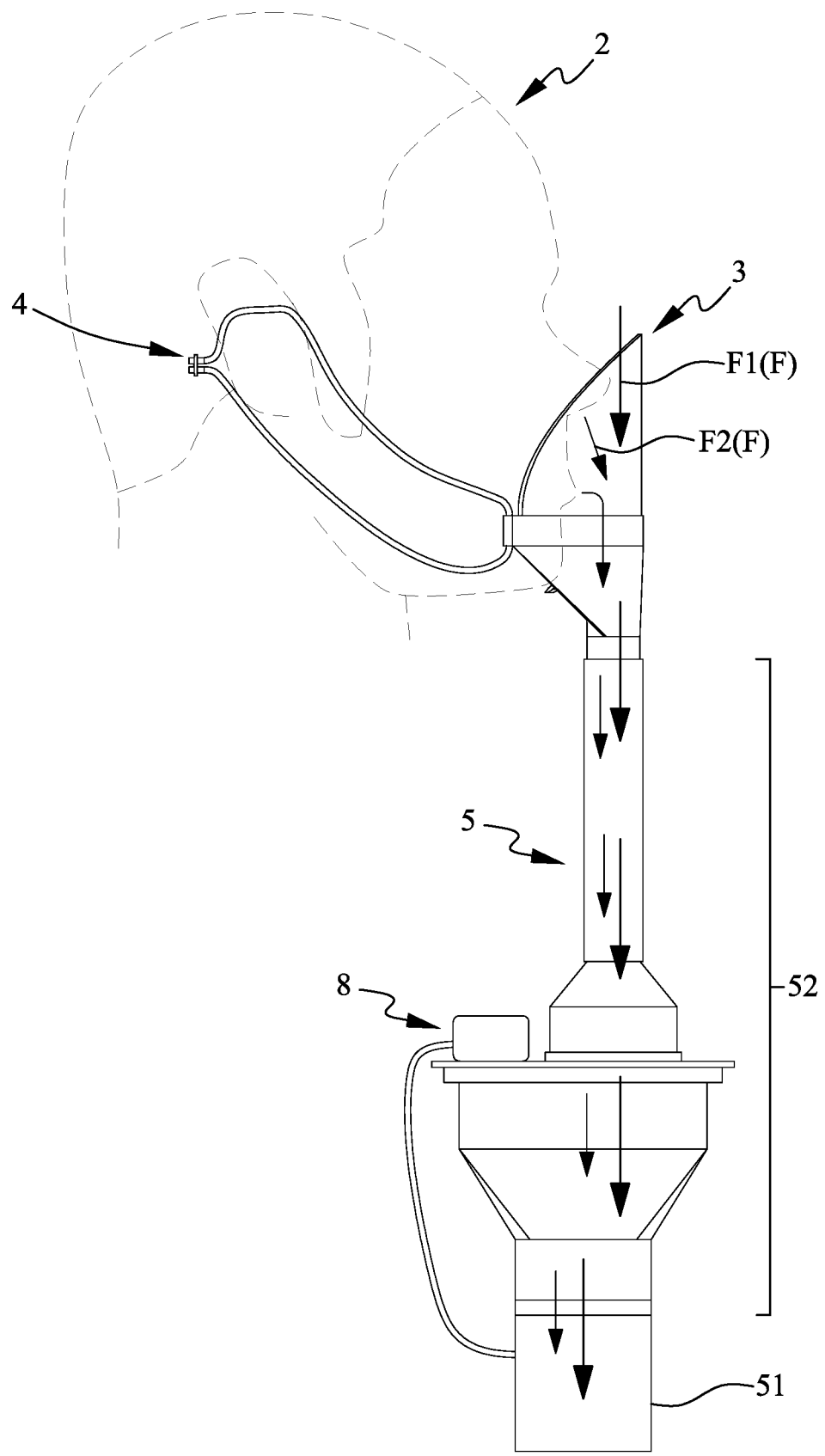
FIG. 10 shows the manner in which the capture and filtration device of the present invention operates to form a suction airflow.

Please refer to FIG. 10. The power supply 8 is electrically connected to the fan 51 to keep the fan rotating continuously to produce the suction airflow F in the capture and filtration device 1. The suction airflow F produced by the rotating fan 51 generates negative pressure in the mask 3 to thereby draw external air F1 into the mask 3 via the air-in space 33. And, when the user 2 respires or speaks, an amount of breathing-out air F2 also spreads in the mask 3. Both the drawn-in external air F1 and the breathing-out air F2 is collected by the mask 3 and sucked into the suction assembly 5 via the open air exit 303 and the inlet end 531, and is finally discharged from the suction assembly 5 via the outlet end 541 by the fan 51. In the course of being sucked into and discharged from the suction assembly 5, the external air F1 and the breathing-out air F2 will pass the secondary filtering material 7 and the filtering material 6 sequentially to ensure thorough filtration of any virus in the discharged air.

Figure 11A:
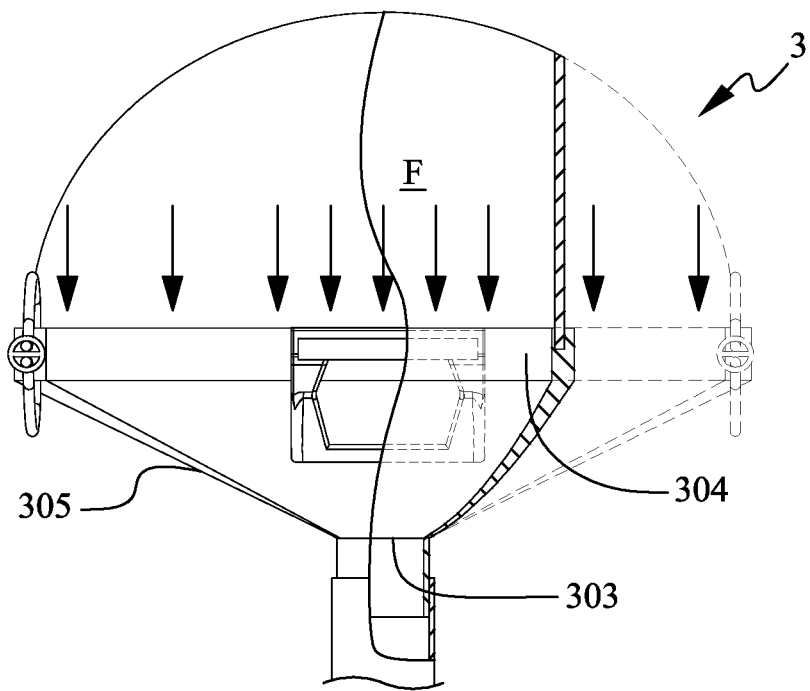
FIG. 11A shows how the suction airflow is distributed in the mask when the capture and filtration device of the present invention uses only a filter material.

Please refer to FIG. 11A. The open air exit 303 is located at a central area of the collecting passage 304. When the capture and filtration device 1 of the present invention only has the filtering material 6 (not shown in FIG. 11A) mounted in the mounting shell 55, external air being sucked into the collecting passage 304 will have a relatively higher airflow strength at the central area of the collecting passage 304 and a relatively weaker airflow strength at areas outside the central area.

Figure 11B:
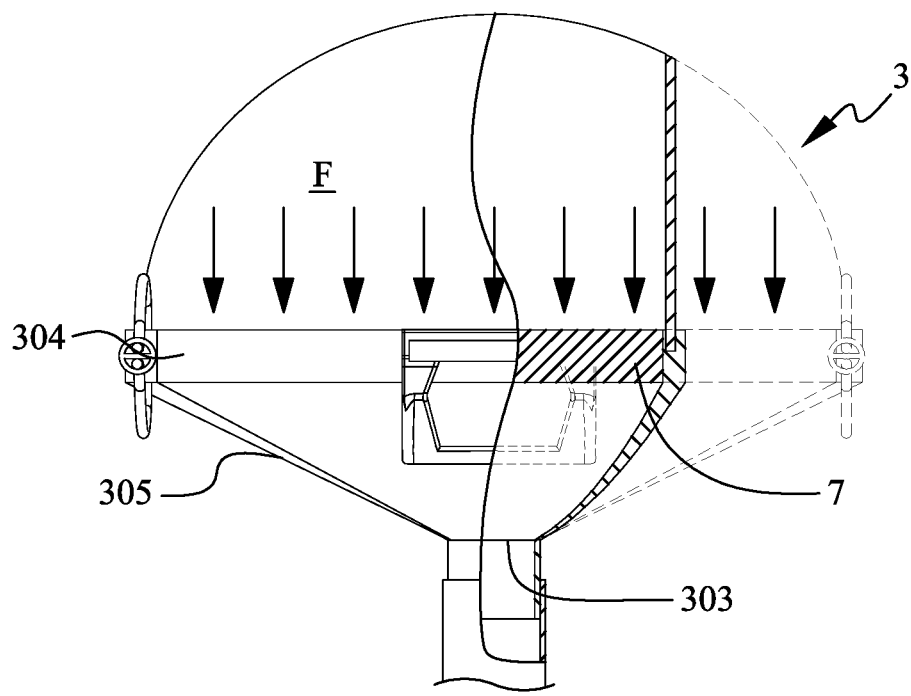
FIG. 11B shows how the suction airflow is distributed in the mask when the capture and filtration device of the present invention further uses a secondary filter material along with the filter material.

Please refer to FIG. 11B, which shows the capture and filtration device 1 of the present invention has the filtering material 6 (not shown in FIG. 11B) mounted in the mounting shell 55 and the secondary filtering material 7 mounted in the collecting passage 304 at the same time. The secondary filtering material 7 can be so designed to have different internal impedances. When the external air is sucked into the funnel portion 305, it is rectified and therefore the same airflow strength is found at the central area and the outer side areas of the collecting passage 304.

Figure 12:
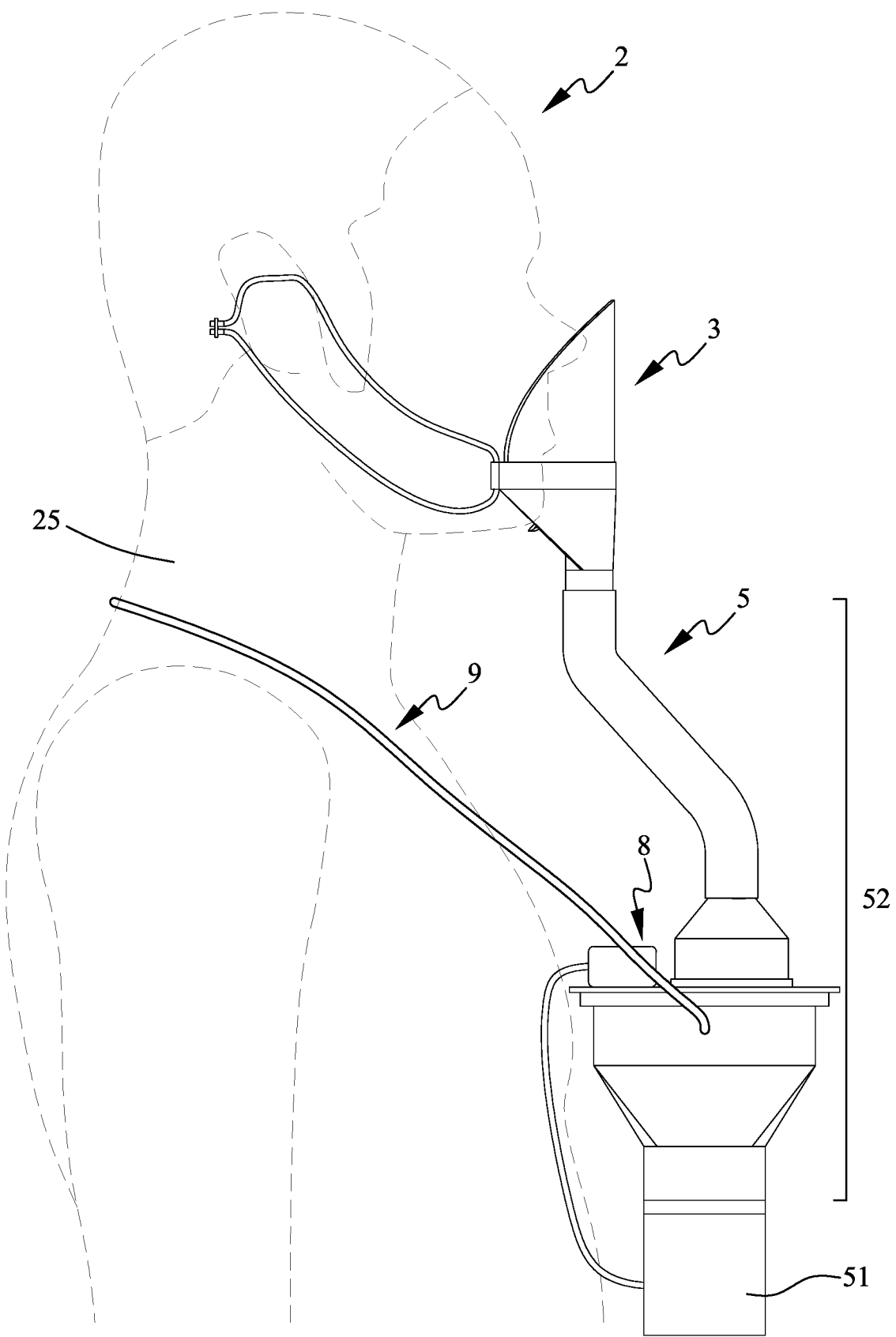
FIG. 12 shows a third embodiment of the capture and filtration device of the present invention.

Please refer to FIG. 12 that shows a third embodiment of the present invention. In the third embodiment, the capture and filtration device 1 further includes auxiliary wearing member 9 connected to the suction assembly 5, so that a wearing space is defined between the auxiliary wearing member 9 and the suction assembly 5 for receiving the user's neck 25 therein. With the auxiliary wearing member 9 put around the user's neck 25, an overall weight of the capture and filtration device 1 can be supported on the neck 25. In other operable embodiments, the auxiliary wearing member 9 can be used to hold the capture and filtration device 1 to the user's upper half torso near the user's waist (not shown).

Figure 13:
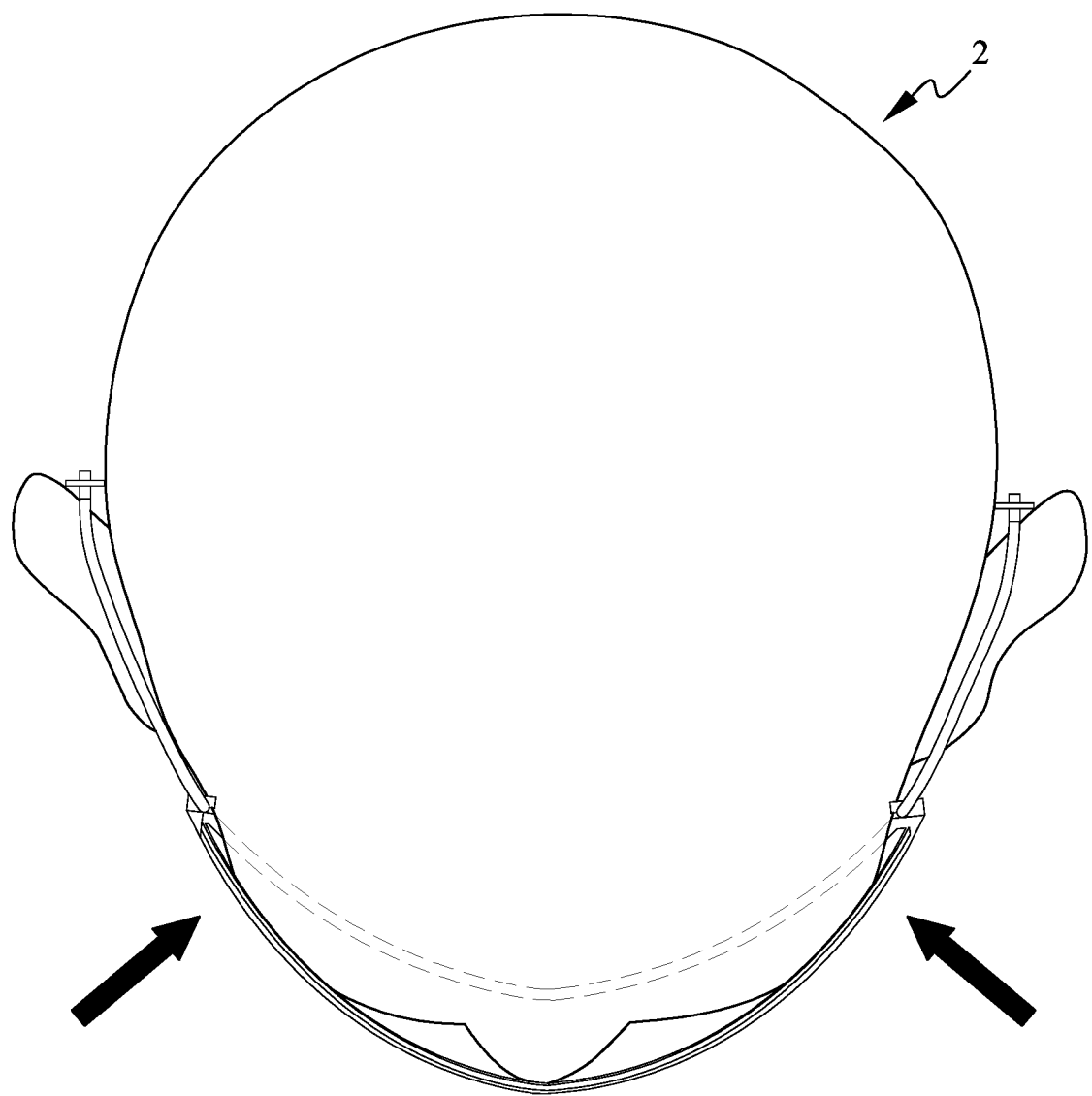
FIG. 13 shows a fourth embodiment of the capture and filtration device of the present invention.

Please refer to FIG. 13, in which a fourth embodiment of the present invention is shown. In the fourth embodiment, the mask 3 is made of a flexible material, and a first distance is defined between the two locating elements 307 of the partition section 30. As indicated by the arrows in FIG. 13, the partition section 30 of the mask 3 in the fourth embodiment is inward elastically deformable when the mask 3 is subjected to a pulling force from the wearing member 4, such that the first distance is changed to a second distance shorter than the first distance and the partition section 30 is brought to a position closer to the user's cheeks and transformed into a mask providing increased covering area. In addition, the partition section 30 of the mask 3 in the fourth embodiment may also be made of a rigid material and directly have a shape as that shown in FIG. 13. In this case, the mask 3 can have two sides in direct contact with the user's cheeks without being flexibly deformed.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An open type breathing-out particles capture and filtration device, comprising:
   a mask including:
   a partition section for fitting on an area beneath a user's mouth; the partition section having a first end configured to be located closer to the user and configured into a first curved wall, a second end configured to be located farther away from the user and configured into a second curved wall, and an open air exit located between the first end and the second end; and a collecting passage is defined between the first curved wall and the second curved wall; the partition section further including a funnel portion that is connected at an upper side to the first and the second curved wall and has a lower side to form the open air exit, such that a downward tapered passage is defined in the funnel portion between the upper side and the lower side;
   a supporting section being connected to the first end of the partition section for contacting with the user's chin; and
   a shield section being upward extended from the second end of the partition section to shield in front of the user's nose, such that an open air-in space is formed between an upper edge of the shield section and the user's face;
   a wearing member being connected to the mask for holding the mask to the user's head;
   a suction assembly including an air expelling pipe assembled to the open air exit of the partition section, and a fan assembled to the air expelling pipe;
   a filtering material being mounted in one of the mask and the suction assembly; and
   a power supply being electrically connected to the suction assembly for driving the fan to rotate and produce a suction airflow in the mask and the air expelling pipe, such that an external air flowed into the mask via the air-in space and an air breathed out of the user's nose and mouth are sucked to pass through the filtering material before being discharged from the suction assembly into an external environment.

2. The open type breathing-out particles capture and filtration device as claimed in claim 1, wherein the filtering material is mounted in the collecting passage; the second curved wall is formed with an open-top insertion groove, and the shield section includes an insertion portion and a shielding portion; the insertion portion being correspondingly inserted into the insertion groove to hold the shield section on the partition section, and the shielding portion being exposed from the partition section.

3. The open type breathing-out particles capture and filtration device as claimed in claim 1, wherein the shield section is inward slant relative to the partition section, such that a first top-view cross-sectional profile taken at the air-in space is smaller than a second top-view cross-sectional profile taken at the collecting passage of the partition section.

4. The open type breathing-out particles capture and filtration device as claimed in claim 1, wherein the shield section has an upper edge that is gradually inclined downward from a central location toward two lateral ends of the shield section, so that a curved shielding wall is formed on the shield section without contacting with the user's face.

5. The open type breathing-out particles capture and filtration device as claimed in claim 1, wherein the supporting section includes a first supporting member for contacting with a front side of the user's chin and a second supporting member for contacting with an area beneath the user's chin.

6. The open type breathing-out particles capture and filtration device as claimed in claim 5, wherein the first end of the partition section is provided with a female connecting member, and a male connecting member is connected with the first supporting member; the male connecting member being correspondingly engaged with the female connecting member, such that the supporting section is selectively detachable from the partition section, allowing the user to freely change the supporting section and the shield section.

7. The open type breathing-out particles capture and filtration device as claimed in claim 1, wherein the air expelling pipe includes a first adaptor, a second adaptor, and a mounting shell located between the first and the second adaptor; the filtering material being mounted in the mounting shell, and the fan being mounted on the second adaptor; the mounting shell having a first flow cross-sectional area located adjacent to the first adaptor and a second flow cross-sectional area located adjacent to the second adaptor, and the second flow cross-sectional area being larger than the first flow cross-sectional area.

8. The open type breathing-out particles capture and filtration device as claimed in claim 1, further comprising a secondary filtering material being mounted in the other one of the mask and the suction assembly, such that the air breathed out of the user's nose and mouth passes through the filtering material and the secondary filtering material.

9. The open type breathing-out particles capture and filtration device as claimed in claim 1, further comprising auxiliary wearing member connected to the suction assembly for holding the suction assembly to the user's upper half torso.

10. The open type breathing-out particles capture and filtration device as claimed in claim 1, wherein the shield section is made of a flexibly deformable material for forming a transparent shielding sheet; a V-shaped cut is formed at a top center of the transparent shielding sheet and two edges of the transparent shielding sheet at two opposite sides of the V-shaped cut being movable inward toward each other, such that the shield section is capable of being bent into a three-dimensional configuration.

* * * * *